United States Patent [19]

Dyson

[11] Patent Number: 4,853,008

[45] Date of Patent: Aug. 1, 1989

[54] COMBINED DISC AND SHROUD FOR DUAL CYCLONIC CLEANING APPARATUS

[75] Inventor: James Dyson, Bathford, England

[73] Assignee: Notetry Limited, Bristol, England

[21] Appl. No.: 224,694

[22] Filed: Jul. 27, 1988

[51] Int. Cl.$^4$ ............................................. B01D 45/12
[52] U.S. Cl. ....................................... 55/345; 55/391; 55/395; 55/429; 55/459.1; 209/144
[58] Field of Search ............... 55/345, 391, 394, 395, 55/410, 429, 459.1, 473; 209/144

[56] References Cited

U.S. PATENT DOCUMENTS

| | | | |
|---|---|---|---|
| 1,752,231 | 3/1930 | Clarkson | 55/410 |
| 3,925,045 | 12/1975 | Cheng | 55/345 |
| 4,571,772 | 2/1986 | Dyson | 15/335 |
| 4,573,236 | 3/1986 | Dyson | 15/333 |
| 4,593,429 | 6/1986 | Dyson | 15/353 |
| 4,643,748 | 2/1987 | Dyson | 55/338 |
| 4,756,729 | 7/1988 | Brunnmair et al. | 55/391 |

*Primary Examiner*—Jay H. Woo
*Assistant Examiner*—C. Scott Bushey
*Attorney, Agent, or Firm*—Ian C. McLeod

[57] ABSTRACT

A combined disc and shroud unit (30) for use in a dual cyclonic cleaner (10) is described. The unit fits on the outside surface (12b) of the cyclone (12) and aids in removal of dirt and fibrous particles in the container (11). Improved separation is achieved because of the unit.

28 Claims, 2 Drawing Sheets

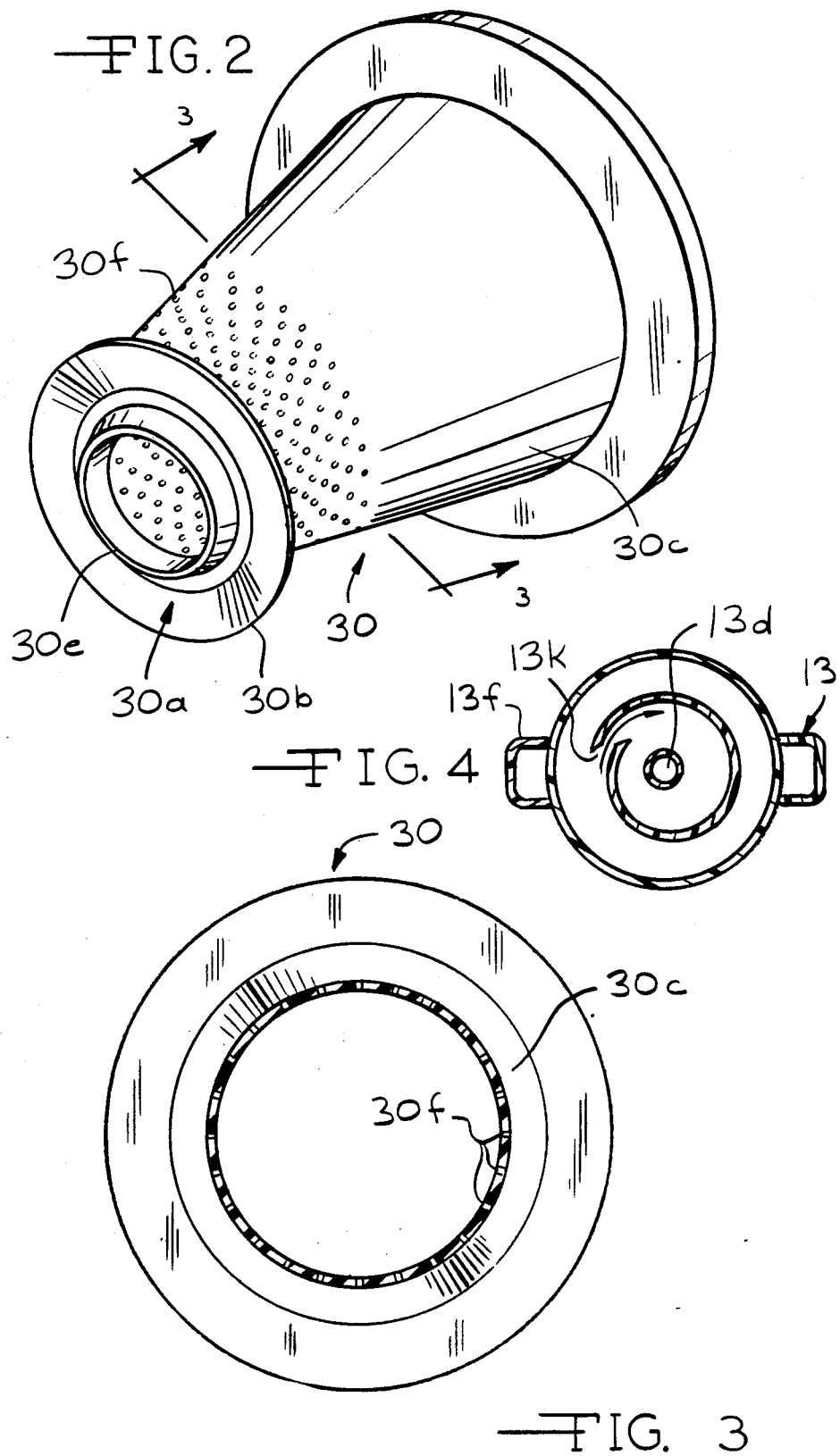

COMBINED DISC AND SHROUD FOR DUAL CYCLONIC CLEANING APPARATUS

BACKGROUND OF THE INVENTION (1) Field of the Invention

The present invention relates to a combined disc and shroud for a dual cyclonic cleaning apparatus. In particular the present invention relates to an apparatus which has an improved means for retaining dirt in an outer cyclonic container while allowing clean air to pass into a frusto-conically shaped inner cyclone.

(2) Prior Art

Cyclonic vacuum cleaning apparatus are shown in my U.S. Pat. Nos. 4,573,236, 4,593,429, 4,571,772 and 4,643,748. My U.S. Pat. No. 4,643,748 describes a dual cyclonic cleaning apparatus wherein a disc is mounted on the outside of a frusto-conically shaped inner cyclone in order to retain dirt in a first cyclonic cleaner. A separate shroud is provided for inlet of air into the second cyclone, including a moveable collar to dislodge accumulated dirt. A perforated inlet to the shroud has also been used on a cyclonic vacuum cleaner marketed in Japan in place of the collar. In these cleaners, the shroud and disc are separate from each other although both function to retain dirt particularly fibrous dirt in the container. The separate disc and shroud work well; however, there was a need for an improved design providing better separation of dirt in the outer cyclone than was achieved by the earlier apparatus.

It was found that by experimenting with the position of the holes and their location it was possible to reduce the blocking of the holes by fibrous particles.

OBJECTS

It is therefore an object of the present invention to provide an improved cleaning apparatus wherein the shroud and disc are combined together for mounting on the outside of the inner cyclone. Further, it is an object of the present invention to provide a combined disc and shroud which is simple and inexpensive to construct and easy to clean of fibrous matter, and which at the same time prevents escape from the outer cyclone of fibrous matter (or in the case of over-filling by the operator of all matter) and at the same time prevents or discourages the blocking of the holes by fibrous particles. These and other objects will become increasingly apparent to those skilled in the art and by reference to the drawings.

IN THE DRAWINGS

FIG. 2 is a perspective view of the combined disc and shroud.

FIG. 3 is a cross-sectional view along line 3—3 of FIG. 2 showing the perforations 30f.

FIG. 4 is a cross-sectional view along line 5—5 of FIG. 1 showing the tangential entry into the inner cyclone 12.

GENERAL DESCRIPTION

Figure 1:
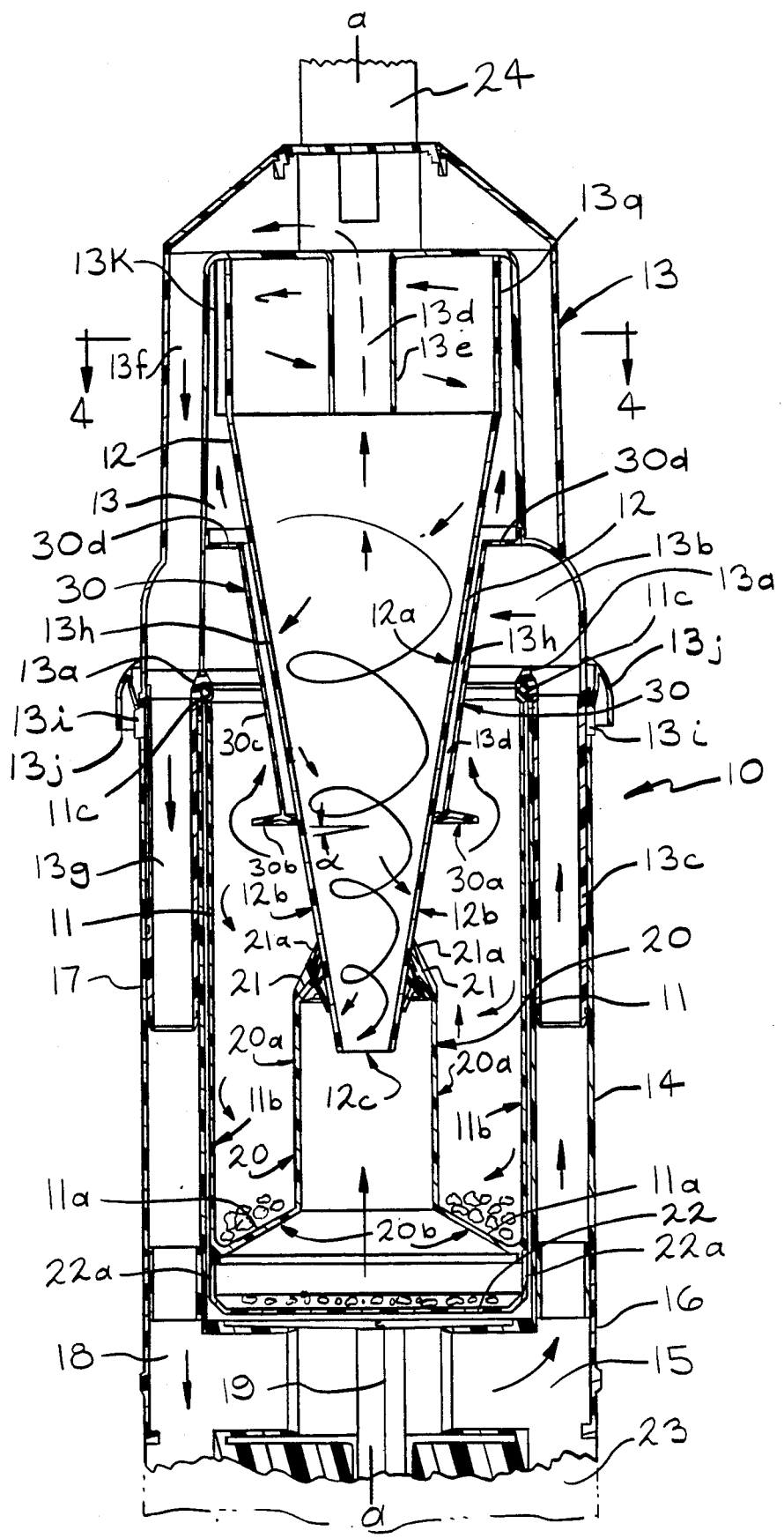
FIG. 1 is a front cross-sectional view of the preferred upright vacuum cleaning apparatus of the present invention, particularly showing the mounting of the combined shroud and disc on the outside of the inner cyclone.

The present invention relates to a cleaning apparatus including an outer container comprising a bottom and a sidewall extending to and meeting the bottom, the sidewall having an interior surface, a dirty air inlet which is oriented for supplying dirt laden air into the container tangentially to the interior surface of the outer container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an airflow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating around the frusto-conical interior surface of the cyclone and depositing the dirt in the receiving chamber the improvement which comprises:

a shroud means mounted on and around outer surface of the cyclone and having opposed ends along the longitudinal axis and providing for outlet air from the container into the air inlet to the cyclone wherein the shroud means is mounted below the air inlet to the cyclone at one of the opposed ends of the shroud means and extends along (preferably substantially parallel to) the outer surface to a position intermediate to the cone opening and the air inlet, wherein the shroud means contacts the outer surface of the cyclone for closure (which does not necessarily have to seal to the outer cyclone) at the other of the ends, and wherein the shroud means has perforations adjacent to the intermediate position for the outlet of air; and disc means provided on the shroud means at the position intermediate the cone opening and the air inlet to the cyclone and around the axis of the cyclone with a space between the interior surface of the container and the disc means for passage of air, wherein the disc means aids in dirt removal in the first container. The disc particularly holds fluff down in the container.

SPECIFIC DESCRIPTION

FIGS. 1 and 4 show a cleaning apparatus 10, such as in an upright vacuum cleaner, including an outer cyclone or container 11 and an inner cyclone 12. The container 11 and cyclone 12 are relatively long and slender along the longitudinal axis a—a. The outer container 11 has a bottom 11a and a cylindrical inner surface 11b which extends from the bottom 11a. The container 11 is removable from an air-flow directing head 13. A flexible ring seal 13a engages the end surface 11c of the outer container 11. The head 13 includes a dirty air inlet passage 13b connected to a pipe 13c projecting downward from the head 13 into an inlet pipe 14 connected to an air inlet chamber 15 in cleaner casing 16. An outlet passage 13d is provided in the head 13 by conduit 13e leading to passage 13f connected to pipe 13g projecting into an outlet pipe 17 leading to air outlet chamber 18 in casing 16. The air could vent at the top of the head 13 (not shown). There are o-ring seals 13i on the outside of pipes 13c and 13g, respectively, sealing with pipes 14 and 17, respectively. Motor pan 19 draws air from cleaner head 23 and blows it to chamber 15. The cleaner head 23 can pivot on the cleaner 10 and can also have a brush (not shown). A handle 24 is provided for moving the upright cleaner 10.

The cyclone 12 has a frusto-conical shape and an inner wall 12a leading to a cone opening 12c and an outer wall 12b. A portion of the cyclone 12 and the cone opening 12c projects into a receiving and collecting chamber 20 for collecting dirt from cyclone 12. The outer wall 12b of the inner cyclone 12 engages a tapered ring seal 21 mounted on one end of an elongated cylindrical portion 20a of the receiving chamber 15. The tapered seal 21 includes at least one concentric ring 21a which engage the outer wall 12b of the cyclone 12. The receiving chamber 20 is preferably integrally joined with a frusto-conical or outwardly tapered portion 20b which also serves as the bottom 11a of the container 11. A removable dish shaped member 22 covers the end of the tapered portion 15b. The sidewalls 22a are cylindrical.

A combined integral shroud and disc unit 30 is mounted intermediate the inlet 13k to the cyclone 12 and the cone opening 12c as particularly shown in FIG. 1. The unit 30 provides an outlet passage 13h from the container 11. The unit 30 includes a disc 30a which is preferably conically shaped with a larger downwardly tapered portion 30b, facing the bottom 11a of the container 11. The unit 30 is tapered with walls 30c preferably parallel to the outside 12b of the cyclone 12. The walls 30c end in a flange 30d which surrounds and encloses the inlet passage 13k to the inner cyclone 12. A lower portion 30e contacts the outside 12b of the cyclone 12 adjacent the disc 30b. Perforations 30f are provided around the wall 30c on about a lower one-third of the wall 30c adjacent the disc 30b. The disc preferably has a downwardly inclined angle alpha between about 97½ to 110° from the axis area or 7½ to 20° from a line perpendicular to the axis.

In operation, the fan unit 19 blows air into inlet chamber 15 through tube 14 into inlet 13b of the container 11. The air swirls down around the inner wall 11b of the container 11 and up along the outside of cylindrical portion 20a of receiver 20, moves along outer wall 12b, over disc 30b, through perforations 30f and up through passage 13h defined by shroud unit 30 and wall 12b. The air then moves into inlet passage 13k of had 13 and into the inner cyclone 12 wherein it moves around inner wall 12a and to cone opening 12c and then moves upward to outlet 13d in passage 13e and then exhausts to atmosphere or through tube 17 and chamber 18 to motor fan. The dirt collects on the bottom 11a of the container 11 and in the dish shaped member 22 as shown. Finer dirt collects primarily in the dish shaped member 22. The inlet chamber 15 is preferably connected to the cleaning head 23.

It has been found that having the perforations 30f immediately adjacent the disc 30b provides an advantage in separation. In the prior designs of U.S. Pat. No. 4,571,772, the shroud was remote from the disc, and thus allowed a greater chance of dirt escaping into the inner cyclone 12 and helps clogging of the holes by fibrous particles. Preferably the cross-sectional area of the perforations 30f exceeds the cross-sectional area of either the inlet passage 13b or outlet passage 13k.

It is intended that the foregoing description be only illustrative and that the present invention be limited only by the hereinafter appended claims.

I claim:
1. In a cleaning apparatus including an outer container comprising a bottom and a sidewall extending to and meeting the bottom, the sidewall having an interior surface, a dirty air inlet which is oriented for supplying dirt laden air into the container tangentially to the interior surface of the outer container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating around the frusto-conical interior surface of the cyclone and depositing the dirt in the receiving chamber the improvement which comprises:
(a) a shroud means mounted on and around the outer surface of the cyclone and having opposed ends along the longitudinal axis and providing for outlet air from the container into the air inlet to the cyclone wherein the shroud means is mounted at one end below the air inlet to the cyclone and extends along the outer surface with the other end at a position intermediate to the cone opening and the air inlet to the cyclone, wherein the shroud means contacts the outer surface of the cyclone for closure at the other of the ends and wherein the shroud means has perforations adjacent to the position intermediate to the cone opening for the flow of air from the outer container to the cyclone inlet; and
(b) disc means provided on the shroud means at a lower longitudinal extent of the shroud means and the air inlet of the cyclone and around the axis of the cyclone with a space between the interior surface of the container and the disc means for passage of air, wherein the disc means aids in dirt removal in the first container by preventing some of the dirt from flowing into the air inlet to the cyclone.

2. The apparatus of claim 1 wherein the disc means is circular in cross-section around the longitudinal axis of the cyclone.

3. The apparatus of claim 1 wherein the disc means has a conical shape around the shroud means such that a larger portion of the conical shape faces towards the bottom of the container.

4. The apparatus of claim 3 wherein the conical shape when viewed as a cross-section of the shroud means and disc means through the longitudinal axis is at a downwardly inclined angle of about 7½ to 20° from a line perpendicular to the longitudinal axis of the cyclone.

5. The apparatus of claim 1 wherein the perforations in the shroud means are circular and are provided around the circumferential extent of the shroud means and cover about one-third of the shroud means above the disc means.

6. The apparatus of claim 1 wherein the shroud means has a flange around the longitudinal axis at the end adjacent the air inlet to the cyclone which is in close relationship to the outside of the cyclone so as to provide a chamber providing the inlet to the cyclone.

7. The apparatus of claim 1 wherein the disc means is positioned about one-third of the distance between the cone opening and the air inlet of the cyclone.

8. The apparatus of claim 1 wherein the dirt receiving and collecting chamber is mounted on the outer surface of the cyclone and has a conical portion adjacent the bottom of the container which tapers outward towards the sidewall and the bottom of the container.

9. The apparatus of claim 8 wherein the chamber has a cylindrical portion which extends from the outer surface of the cyclone to the conical portion which tapers outward from the cylindrical portion towards the sidewall and the bottom of the container.

10. The apparatus of claim 9 wherein the cylindrical portion has a diameter smaller than a diameter of the disc means.

11. The apparatus of claim 1 wherein the outer container has a substantially cylindrical sidewall.

12. The apparatus of claim 11 wherein the apparatus is a vacuum cleaner for household use, wherein the inlet to the container and the outlet from the cyclone include separate tubes mounted parallel to the axis adjacent the opposite sides of the container leading to the inlet and from the outlet and wherein the means for generating an air flow is mounted in a casing with a cleaning means which contacts a surface to be cleaned, wherein the means for generating an air flow draws air into the inlet to the container through one of the tubes and out the outlet from the cyclone through the other of the tubes to and through the casing.

13. The apparatus of claim 12 wherein the disc means is circular in cross-section around the longitudinal axis of the cyclone.

14. The apparatus of claim 12 wherein the disc means has a conical shape around the shroud means such that a larger portion of the conical slope faces towards the bottom of the container.

15. The apparatus of claim 14 wherein the conical shape when viewed in a cross-section of the shroud means and disc means through the longitudinal axis is at an angle of about 7½ and 20° to a line perpendicular to the longitudinal axis of the cyclone.

16. The apparatus of claim 12 wherein the perforations are circular and are provided around the circumferential extent of the shroud means and cover about one-third of the shroud means above the disc means.

17. The apparatus of claim 12 wherein the shroud means has a flange around the longitudinal axis at the end adjacent the inlet to the cyclone which is in close spaced relationship to the outside of the cyclone.

18. The apparatus of claim 12 wherein the disc means is positioned about one-third of the distance between the cone opening and the air inlet of the cyclone.

19. The apparatus of claim 12 wherein the dirt receiving and collecting chamber is mounted on the outer surface of the cyclone and has a conical portion adjacent the bottom of the container which tapers outward towards the sidewall and the bottom of the container.

20. The apparatus of claim 19 wherein the chamber has a cylindrical portion which extends from the outer surface of the cyclone to the conical portion which tapers outward from the cylindrical portion towards the sidewall and the bottom of the container.

21. The apparatus of claim 20 wherein the cylindrical portion has a diameter smaller than a diameter of the disc means.

22. The apparatus of claim 1 wherein the total cross-sectional area of all the perforations exceeds the cross-sectional area of each of the air inlet and the air outlet from the cyclone.

23. A shroud means for use in a cleaning apparatus including an outer container comprising a bottom and a sidewall extending to and meeting the bottom, the sidewall having an interior surface, a dirty air inlet which is oriented for supplying dirt laden air into the container tangentially to the interior surface of the outer container which has a circular cross-section and an air outlet from the container; a circular cross-sectioned cyclone having a longitudinal axis mounted inside the container, the cyclone comprising a cyclone air inlet at an upper end having a first diameter of the cyclone in air communication with the air outlet of the container, an interior dirt rotational surface of frusto-conical shape for receiving an air flow from the air inlet and for maintaining its velocity to a cone opening smaller in diameter than the diameter of the upper end of the cyclone, the air inlet being oriented for supplying air tangentially to the surface, an outer surface of frusto-conical shape, and a cyclone air outlet communicating with the interior of the cyclone adjacent the upper end of the cyclone; a dirt receiving and collecting chamber extending from the cone opening; and means for generating an air flow which passes sequentially through the dirty air inlet, the container, the cyclone air inlet, the cyclone, the receiving chamber and the cyclone air outlet, the air flow rotating around the frusto-conical interior surface of the cyclone and depositing the dirt in the receiving chamber the improvement which comprises:

(a) a shroud means to be mounted on and around the outer surface of the cyclone and having opposed ends along the longitudinal axis and providing for outlet air from the container into the air inlet to the cyclone wherein the shroud means is mounted at one end below the air inlet to the cyclone at one of the opposed ends of the shroud means and extends along the outer surface with the other end at a position intermediate to the cone opening and the air inlet to the cyclone, wherein the shroud means contacts the outer surface of the cyclone for closure at the other of the ends and wherein the shroud means has perforations adjacent to the position intermediate to the cone opening for the flow of air from the outer container to the cyclone inlet; and (b) disc means provided on the shroud means at a lower longitudinal extent of the shroud means and the air inlet of the cyclone and around the axis of the cyclone with a space between the interior surface of the container and the disc means for passage of air, wherein the disc means aids in dirt removal in the first container by preventing some of the dirt from flowing into the air inlet to the cyclone.

24. The shroud means of claim 23 wherein the disc means is circular in cross-section around the longitudinal axis of the cyclone.

25. The shroud means of claim 23 wherein the disc means has a conical shape around the shroud means such that a larger portion of the conical shape faces towards the bottom of the container.

26. The shroud means of claim 25 wherein the conical shape when viewed as cross-section of the shroud means and disc means through the longitudinal axis is at a downwardly inclined angle of about 7½ to 20° from a line perpendicular to the longitudinal axis of the cyclone.

27. The shroud means of claim 23 wherein the perforations in the shroud means are circular and are provided around the circumferential extent of the shroud means and cover about one-third of the shroud means above the disc means.

28. The shroud means of claim 1 wherein the shroud means has a flange around the longitudinal axis at the end adjacent the air inlet to the cyclone which is in close relationship to the outside of the cyclone so as to provide a chamber providing the inlet to the cyclone.

* * * * *